Figure 1:
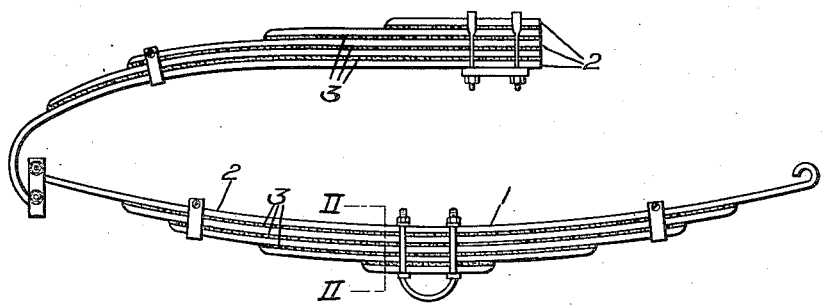

W. H. WOODMAN.
SELF LUBRICATING LEAF SPRING.
APPLICATION FILED SEPT. 13, 1919.

1,427,340.

Patented Aug. 29, 1922.

WITNESSES:
J. B. Merrill
O. E. Bee.

INVENTOR
William H. Woodman
BY
Wesley G. Carr
ATTORNEY

UNITED STATES PATENT OFFICE.

WILLIAM H. WOODMAN, OF EDGEWOOD, PENNSYLVANIA, ASSIGNOR TO WESTINGHOUSE ELECTRIC & MANUFACTURING COMPANY, A CORPORATION OF PENNSYLVANIA.

SELF-LUBRICATING LEAF SPRING.

1,427,340.       Specification of Letters Patent.    Patented Aug. 29, 1922.

Application filed September 13, 1919. Serial No. 323,589.

*To all whom it may concern:*

Be it known that I, WILLIAM H. WOODMAN, a citizen of the United States, and a resident of Edgewood, in the county of Allegheny and State of Pennsylvania, have invented a new and useful Improvement in Self-Lubricating Leaf Springs, of which the following is a specification.

My invention relates to self-lubricating springs and it has, for its primary object, the construction of leaf springs in such manner as to insure noiseless and efficient operation.

The advantage of self-lubricating leaf springs can well be appreciated when employed in vehicles such as automobiles, where it is difficult and tedious work to frequently separate the leaves of the several springs in order to deposit grease or a similar lubricant therebetween. It is well known that, if the leaves of a spring are not lubricated, in some manner, they eventually become rusted and, consequently, noisy. Furthermore, if badly rusted, their efficiency is materially decreased and their appearance impaired. Although the springs may be well lubricated by separating the several leaves thereof and disposing a suitable lubricant between them, the lubricant continually works out and must be replaced frequently. The escaping lubricant also collects dirt and detracts from the appearance of the springs.

One object of my invention, therefore, resides in the provision of a means for lubricating springs which shall have exceptionally long life and shall provide adequate lubrication for the springs throughout the entire life of the lubricating means.

Another object of my invention is to provide means for lubricating springs which shall be of such character as to not materially increase the bulk of the spring.

It is possible to lubricate a spring or a similar article by forming grooves, pockets, or openings therein and by inserting a lubricant in the recesses or openings thus provided. This procedure, however, weakens the spring and, therefore, materially offsets the advantages gained by the lubrication. Another object of my invention, therefore, is to provide means for lubricating springs which shall not reduce their strength and which, at the same time, shall provide adequate lubrication.

With these and other objects in view, my invention will be more fully described, illustrated in the drawings, in the several views of which corresponding numerals indicate like parts, and then particularly pointed out in the claims.

Figure 2:
Figure 3:
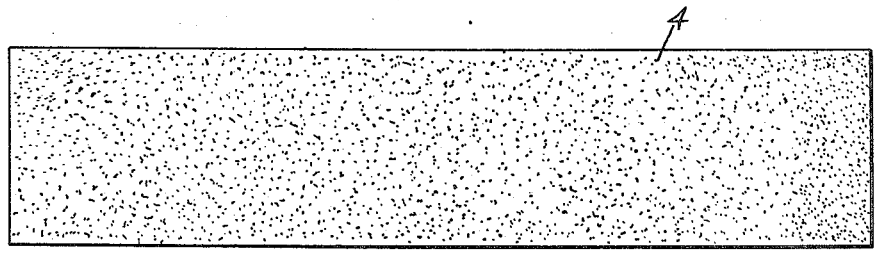
Figure 4:
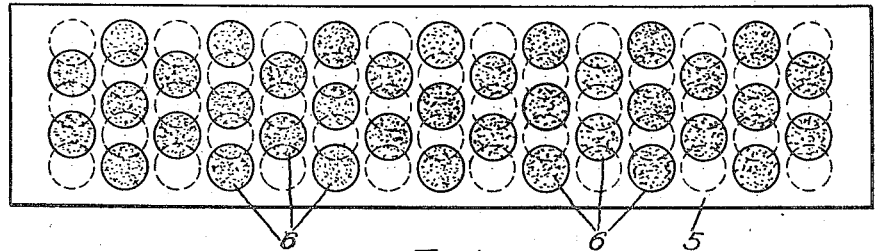

In the drawings, Fig. 1 is a side elevation of a spring constructed in accordance with my invention; Fig. 2 is a sectional view, on a larger scale, taken substantially along the line II—II of Fig. 1; Fig. 3 is a plan view of a strip of material which may be employed as a lubricant between the leaves of a spring, and Fig. 4 is a plan view of a strip of material showing a modified form of my invention.

I may provide a self-lubricating spring, in accordance with my invention, by employing strips of fibrous material which may be impregnated with a suitable binder mixed with a lubricating agent. A strip of material thus prepared may be disposed between the leaves of the spring where it is securely held in place by the ordinary pressure to which the springs are subjected and by the usual retaining means to keep the several leaves in alinement.

In Fig. 1 is shown a spring 1 comprising a plurality of leaves 2 separated by interposed strips of material 3. The strips of material may be prepared by employing suitable sheet material, such as duck, paper or muslin, which may be impregnated with a suitable binder containing a lubricant. I prefer to employ as a binder, a phenolic condensation product, but other binders may be employed to advantage. Any well-known lubricant, suitable for the purpose, may be mixed with the phenolic condensation product when the sheet material is impregnated, as, for example, a lubricant such as graphite. Furthermore, I have found that a small addition of wax may be employed to advantage in that it assists in providing a smooth, finished surface upon the treated material and thereby supplements the lubricating action of the graphite. The percentages of lubricating material employed may be easily determined by preparing a few strips containing various quantities of the lubricant, it being necessary only to exercise care to employ sufficient binder to secure the lubricant in the fibrous material.

The strips of sheet material may be impregnated with a binder containing graphite and a single strip or a number of superimposed strips may then be subjected to heat and pressure in any suitable apparatus, such as a mold or a hot press, to compact the material and to harden the binder, thereby forming a solid homogeneous mass or sheet. The material thus formed may be cut to shape and size and disposed between the leaves of the spring, as shown in Fig. 1, to provide adequate lubrication during the life of the lubricating material.

When a binder, such as a phenolic condensation product, is employed to impregnate the fibrous material, a very durable material is provided which has exceptional wearing qualities and, by disposing a lubricant in the binder, lubrication may be provided for the spring which will require no attention for relatively long periods. Furthermore, on account of the uniformity of the material, the wearing qualities of various strips, prepared in the same manner, will also be uniform. The various strips, employed between the leaves of the springs, will, therefore, wear out at approximately the same time, after which they may be readily renewed.

In Fig. 3 is shown a strip of material 4 prepared as above described. In Fig. 4 is shown another strip of material 5 in which inserts 6 of lubricating material are employed. This is merely to illustrate a modification of my invention and embodies the same principle of treatment as described for the strip of material 4. The strip 5 may be prepared by providing openings in the sheet or sheets which may then be impregnated with a binder after which the openings may be filled with a binder containing a lubricant. If a number of sheets are superimposed to form the strip, the openings in the several sheets are preferably staggered for greater uniformity of strength and lubrication. The strip thus treated may then be subjected to heat and pressure to harden the binder and to compact the material. The above treatment provides a strip of material which may be employed between the leaves of a spring in the manner shown in Fig. 1. The inserts 6 ensure adequate lubrication of the spring throughout the life of the material, and the surrounding material ensures the maintenance of the inserts of lubricating material in place.

It will be appreciated from the foregoing description that a lubricating means for leaf springs may be provided, in accordance with my invention, which shall be highly efficient and which shall require little or no attention after having been disposed in place. The material employed may be relatively thin so that the bulk of the spring is very slightly increased even when strips each comprising several superimposed sheets are employed between the leaves. Also, even though thin material be employed, it possesses such durable wearing qualities that it need not be replaced for a relatively long period of time.

Although I have specifically described a material and method of preparing it to provide lubricating means for leaf springs, it will be obvious that minor changes may be made in the material and the manner of applying it without departing from the spirit of my invention. Furthermore, the same principle may be practiced in providing for proper lubrication of springs other than leaf springs, as, for example, volute springs. I desire, therefore, that no limitations shall be imposed upon my invention except such as are indicated in the appended claims.

I claim as my invention:

1. A self-lubricating spring comprising a plurality of superimposed spring-leaves and layers of fibrous material impregnated with a hardened phenolic condensation product containing a lubricant disposed between the leaves.

2. A self-lubricating spring comprising a plurality of superimposed spring-leaves and strips of fibrous material impregnated with a hardened phenolic condensation product containing graphite disposed between the leaves.

3. A self-lubricating spring comprising a plurality of superimposed spring-leaves and layers of fibrous material impregnated with a hardened phenolic condensation product containing graphite and wax disposed between the leaves.

4. A self-lubricating spring comprising a plurality of superimposed spring-leaves and strips of duck impregnated with a hardened phenolic condensation product containing graphite and wax disposed between the leaves.

5. A self-lubricating spring comprising a plurality of superimposed spring-leaves and strips of fibrous material impregnated with a hardened phenolic condensation product and provided with openings containing inserts of a hardened phenolic condensation product containing graphite disposed between the leaves.

In testimony whereof, I have hereunto subscribed my name this 26th day of Aug., 1919.

WILLIAM H. WOODMAN.